US011656776B2

(12) United States Patent
Kang et al.

(10) Patent No.: US 11,656,776 B2
(45) Date of Patent: May 23, 2023

(54) METHOD, DEVICE, AND PROGRAM PRODUCT FOR CREATING EXTENT ARRAY IN STORAGE SYSTEM

(71) Applicant: EMC IP Holding Company LLC, Hopkinton, MA (US)

(72) Inventors: Jianbin Kang, Beijing (CN); Hongpo Gao, Beijing (CN); Chun Ma, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 24 days.

(21) Appl. No.: 17/318,359

(22) Filed: May 12, 2021

(65) Prior Publication Data
US 2022/0171552 A1 Jun. 2, 2022

(30) Foreign Application Priority Data
Nov. 27, 2020 (CN) .......................... 202011354956.3

(51) Int. Cl.
 *G06F 3/06* (2006.01)
(52) U.S. Cl.
 CPC .......... *G06F 3/0638* (2013.01); *G06F 3/0604* (2013.01); *G06F 3/0689* (2013.01)
(58) Field of Classification Search
 CPC ...... G05B 13/00–048; G05B 15/00–02; G05B 17/00–02; G06F 1/00–3296;
(Continued)

(56) References Cited

U.S. PATENT DOCUMENTS 5,892,915 A * 4/1999 Duso .................... H04L 65/612
 709/219
5,928,327 A * 7/1999 Wang ................. H04N 7/17336
 709/219
(Continued)

FOREIGN PATENT DOCUMENTS

WO WO-2018199794 A1 * 11/2018 .......... G06F 11/1076

OTHER PUBLICATIONS

Y. Li, B. Shen, Y. Pan, Y. Xu, Z. Li and J. C. S. Lui, "Workload-Aware Elastic Striping With Hot Data Identification for SSD RAID Arrays," in IEEE Transactions on Computer-Aided Design of Integrated Circuits and Systems, vol. 36, No. 5, pp. 815-828, May 2017 , doi: 10.1109/TCAD.2016.2604292. (Year: 2017).*
(Continued)

*Primary Examiner* — Daniel C. Chappell
(74) *Attorney, Agent, or Firm* — BainwoodHuang

(57) ABSTRACT

In creating an extent array in a storage system, in response to receiving a request to generate an extent array using idle extents in storage devices, a width of an extent stripe is determined, and a size of the extent array is designated by the storage system. A first extent group and a second extent group are respectively selected from the storage devices based on the width to form a first extent stripe and a second extent stripe, and a first extent at a given position in the first extent group and a second extent at a given position in the second extent group are respectively located in different storage devices. Based on the first extent stripe and the second extent stripe, an address mapping representing the extent array is generated. The address mapping includes association between extent identifiers of extents and extent indexes of the extents.

22 Claims, 8 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 5,974,503 | A * | 10/1999 | Venkatesh | G06F 11/2023 714/E11.073 |
| 6,834,326 | B1 * | 12/2004 | Wang | G06F 11/1076 714/E11.034 |
| 6,839,827 | B1 * | 1/2005 | Beardsley | G06F 3/0689 711/206 |
| 7,774,575 | B2 * | 8/2010 | Seto | G06F 3/0683 711/100 |
| 8,880,788 | B1 * | 11/2014 | Sundaram | G06F 3/0688 711/103 |
| 8,892,938 | B1 * | 11/2014 | Sundaram | G06F 11/2069 714/6.21 |
| 9,152,335 | B2 * | 10/2015 | Sundaram | G06F 3/0641 |
| 9,195,412 | B2 * | 11/2015 | Brown | G06F 3/0608 |
| 9,389,958 | B2 * | 7/2016 | Sundaram | G06F 11/1068 |
| 10,073,621 | B1 * | 9/2018 | Foley | G06F 11/1076 |
| 10,229,022 | B1 * | 3/2019 | Gao | G06F 3/0689 |
| 10,235,059 | B2 * | 3/2019 | Patel | G06F 3/0644 |
| 10,310,752 | B1 * | 6/2019 | Li | G06F 3/0689 |
| 10,318,169 | B2 * | 6/2019 | Dalmatov | G06F 3/0665 |
| 10,365,856 | B2 * | 7/2019 | Gong | G06F 11/1438 |
| 10,496,482 | B1 * | 12/2019 | Foley | G06F 3/0644 |
| 10,740,020 | B2 * | 8/2020 | Gong | G11C 16/349 |
| 10,788,997 | B2 * | 9/2020 | Gong | G06F 3/0619 |
| 10,949,314 | B2 * | 3/2021 | Gong | G06F 11/2094 |
| 11,003,359 | B2 * | 5/2021 | Li | G06F 3/0647 |
| 11,157,190 | B2 * | 10/2021 | Han | G06F 3/0689 |
| 11,188,247 | B2 | 11/2021 | Tang et al. | |
| 11,232,005 | B2 | 1/2022 | Lv et al. | |
| 11,287,996 | B2 | 3/2022 | Kang et al. | |
| 2003/0182502 | A1 * | 9/2003 | Kleiman | G06F 3/0689 714/E11.034 |
| 2006/0041782 | A1 * | 2/2006 | Ali | G06F 11/1092 714/E11.089 |
| 2009/0300315 | A1 * | 12/2009 | Agombar | G06F 3/0608 711/170 |
| 2018/0300066 | A1 * | 10/2018 | Li | G06F 3/0644 |
| 2019/0129614 | A1 * | 5/2019 | Dalmatov | G06F 3/0689 |
| 2019/0129647 | A1 * | 5/2019 | Gong | G06F 3/0616 |
| 2021/0191619 | A1 * | 6/2021 | Dalmatov | G06F 3/0611 |

OTHER PUBLICATIONS

Y. Pan, Y. Li, Y. Xu and Z. Li, "Grouping-Based Elastic Striping with Hotness Awareness for Improving SSD RAID Performance," 2015 45th Annual IEEE/IFIP International Conference on Dependable Systems and Networks, Rio de Janeiro, Brazil, 2015, pp. 160-171, doi: 10.1109/DSN.2015.51. (Year: 2015).*

Kai Hwang, H. Jin and R. S. C. Ho, "Orthogonal striping and mirroring in distributed RAID for I/O-centric cluster computing," in IEEE Transactions on Parallel and Distributed Systems, vol. 13, No. 1, pp. 26-44, Jan. 2002, doi: 10.1109/71.980025. (Year: 2002).*

Zhuo, Baote, et al.; "Storage Management Method, Device, and Computer Program Product," U.S. Appl. No. 17/314,416, filed May 7, 2021.

* cited by examiner

METHOD, DEVICE, AND PROGRAM PRODUCT FOR CREATING EXTENT ARRAY IN STORAGE SYSTEM

CROSS-REFERENCE TO RELATED APPLICATION

This application claims priority to Chinese Patent Application No. CN202011354956.3, on file at the China National Intellectual Property Administration (CNIPA), having a filing date of Nov. 27, 2020, and having "METHOD, DEVICE, AND PROGRAM PRODUCT FOR CREATING EXTENT ARRAY IN STORAGE SYSTEM" as a title, the contents and teachings of which are herein incorporated by reference in their entirety.

TECHNICAL FIELD

Implementations of the present disclosure relate to storage system management, and more particularly, to a method, a device, and a computer program product for creating an extent array in a storage system.

BACKGROUND

With the development of data storage technologies, various data storage devices have been able to provide users with increasingly high data storage capabilities, and the data access speed has also been greatly improved. While data storage capabilities are improved, users also have increasingly high demands for data reliability and extendibility of storage systems. At present, various data storage systems based on Redundant Array of Independent Disks (RAID) have been developed to improve data reliability. When one or more disks in a storage system fail, data in the malfunctioning disks can be reconstructed from data on other normally operating disks.

A mapped RAID has been developed at present. In this mapped RAID, disk is a logical concept and may include a plurality of extents. A plurality of extents included in a logical disk can be distributed on different physical storage devices in a resource pool. For a plurality of extents in one stripe of the mapped RAID, the plurality of extents should be distributed on different physical storage devices, so that when a physical storage device where one of the plurality of extents is located fails, a reconstruction operation may be performed to recover data from physical storage devices where other extents are located.

To facilitate management, an extent array can be created in a storage system based on the mapped RAID technology and according to a pre-specified size (for example, 64G). In existing technical solutions, an extent array includes a plurality of stripes, and extents at a given position in each stripe must be located in the same storage device. This will lead to insufficient utilization of idle storage spaces in the storage devices. At this moment, how to use the storage spaces in the storage devices as effectively as possible has become a technical problem.

SUMMARY OF THE INVENTION

Therefore, it is desirable to develop and implement a technical solution of creating an extent array in a more effective way. It is desirable that the technical solution is compatible with existing storage systems, and by modifying various configurations of existing storage systems, storage devices may be managed in a more effective manner.

According to a first aspect of the present disclosure, a method of generating an extent array in a storage system which includes a plurality of storage devices is provided. In the method, in response to receiving a request to generate an extent array using idle extents in the plurality of storage devices, a width of an extent stripe in the extent array is determined, and a size of the extent array is designated by the storage system. A first group of extents and a second group of extents are respectively selected from the plurality of storage devices based on the width to form a first extent stripe and a second extent stripe, and a first extent at a given position in the first group of extents and a second extent at a given position in the second group of extents are respectively located in different storage devices among the plurality of storage devices. Based on the first extent stripe and the second extent stripe, an address mapping representing the extent array is generated. The address mapping includes an association relationship between extent identifiers of extents in the extent array and extent indexes of the extents in the extent array.

According to a second aspect of the present disclosure, an electronic device is provided. The electronic device includes: at least one processor; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided. The computer program product is tangibly stored on a non-transitory computer-readable medium and includes machine-executable instructions which are used for executing the method according to the first aspect of the present disclosure.

BRIEF DESCRIPTION OF THE DRAWINGS

The features, advantages, and other aspects of respective implementations of the present disclosure will become more apparent from the following detailed description and in conjunction with the accompanying drawings. Certain implementations of the present disclosure are shown herein by way of example and not limitation. In the accompanying drawings, FIG. 1 schematically illustrates a block diagram of a storage system in which implementations of the present disclosure may be implemented.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

In the following, preferred implementations of the present disclosure will be described in more detail with reference to the accompanying drawings. Although the preferred implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure can be fully conveyed to those skilled in the art.

As used herein, the term "including" and variations thereof mean open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," etc., may refer to different or the same objects. Other explicit and implicit definitions may also be included below.

In the context of the present disclosure, a storage system may be a RAID-based storage system. The RAID-based storage system may combine a plurality of storage devices into one disk array. By providing redundant storage devices, the reliability of the entire disk group may greatly exceed that of a single storage device. RAID may provide various advantages over a single storage device, such as enhanced data integration, enhanced fault tolerance, increased throughput or capacity, and so on. There are a plurality of standards for RAID, such as RAID-1, RAID-2, RAID-3, RAID-4, RAID-5, RAID-6, RAID-10, RAID-50, and so on.

Figure 1:
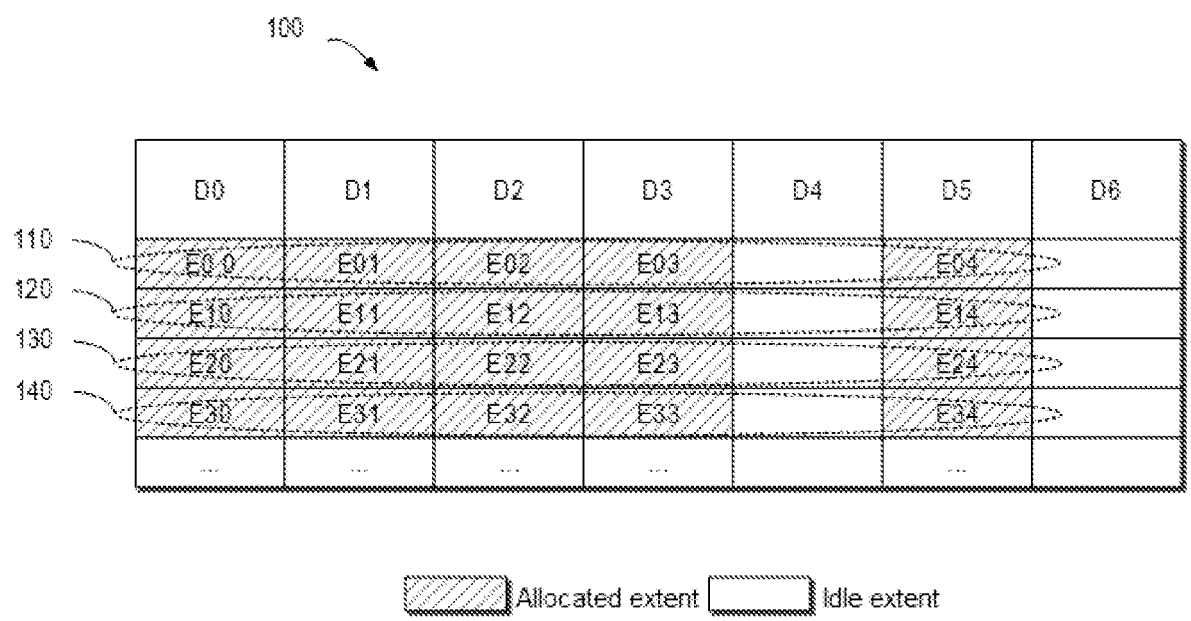

Firstly, an application environment for example implementations of the present disclosure will be described with reference to FIG. 1. FIG. 1 schematically illustrates a block diagram of storage system 100 in which implementations of the present disclosure may be implemented. As shown in FIG. 1, storage system 100 may include a plurality of storage devices (for example, storage devices D0, D1, D2, D3, D4, D5, and D6). Each storage device may include a plurality of extents and each extent may have a physical address. The physical address here may be determined based on a storage device where the extent is located and a position of the extent in the storage device. The extent may have a predetermined size (for example, 4G or other values).

To facilitate management, in a lower layer of the storage system, a plurality of extents may be selected from the plurality of storage devices and an extent array may be generated. The extent array can be further divided into smaller slices to provide users with more fine-grained storage units. In existing technical solutions, an extent array includes a plurality of RAID-based stripes. For example, in a storage system, a size of an extent array may be 64G, and an RAID stripe may be a 4D+1P stripe (the effective storage space is 4G*4=16G). At this moment, the 64G extent array will include 64/16=4 stripes, and each stripe will include 5 extents (wherein 4 extents are used to store data, and 1 extent is used to store checks).

As shown in FIG. 1, extents may be selected from storage devices D0, D1, D2, D3, and D5 respectively, and the extents from the above storage devices may form 4 extent stripes (referred to as stripes) 110, 120, 130, and 140. Each stripe may include 5 extents, and the extents may be identified based on the stripes where the extents are located and the positions of the extents in the stripes. For example, an extent identifier may be defined as "Eij," where the first number "i" represents an identifier of the stripe, and the second number "j" represents the position of the extent in the stripe. Specifically, extent "E00" represents the 0th extent in the 0th stripe, extent "E01" represents the 1st extent in the 0th stripe, and extent "E12" represents the 2nd extent in the 1st stripe.

According to existing technical solutions, the extent array is generated in the manner shown in FIG. 1, and the extents at a given position in each stripe are all located in the same storage device. For example, the 0th extent in each stripe is located in storage device D0, the 1st extent in each stripe is located in storage device D1, and so on. Shaded areas in FIG. 1 show allocated extents for generating an extent array, and blank parts show idle extents. Generating an extent array in the manner shown in FIG. 1 may result in the inefficient use of the idle extents in each storage device. Waste that may occur in the storage system will be described below with reference to FIGS. 2A and 2B respectively.

Figure 2A:
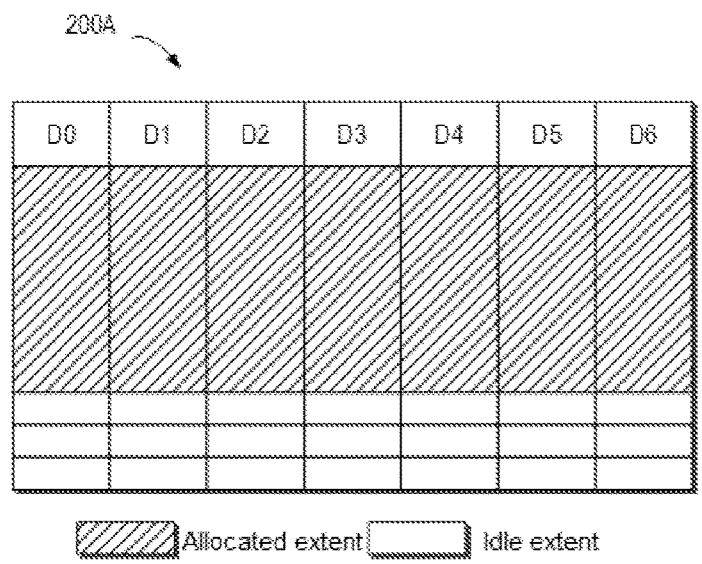
FIGS. 2A and 2B schematically illustrate block diagrams of a process of generating an extent array in a storage system respectively according to a technical solution.
Figure 2B:
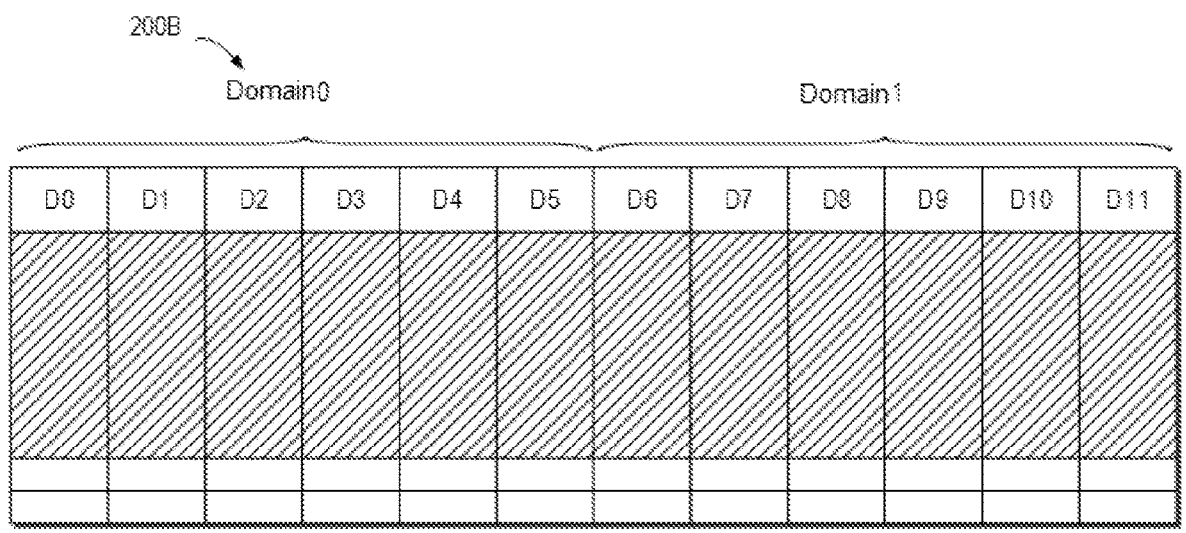

FIG. 2A schematically illustrates a block diagram of process 200A of generating an extent array in a storage system according to a technical solution. As shown in FIG. 2A, suppose that it is desired to allocate 20 idle extents from a plurality of storage devices D0 to D6, although the plurality of storage devices include 21 idle extents at this moment, the position requirements shown in FIG. 1 cannot be met. This will lead to a problem that a large number of idle extents cannot be used. To facilitate management, the plurality of storage devices may be divided into a plurality of domains. FIG. 2B schematically illustrates a block diagram of process 200B of generating an extent array in a storage system including a plurality of domains according to a technical solution. A plurality of storage devices D0 to D11 in the storage system are divided into domain 0 and domain 1. At this moment, storage devices D0 to D5 are located in domain 0, and storage devices D6 to D11 are located in domain 1. Suppose that it is desired to allocate 20 idle extents from the plurality of storage devices, although the plurality of storage devices D0 to D11 include 24 idle extents at this moment, these idle extents do not meet the afore-mentioned position requirements. Therefore, it is expected to develop a technical solution that can allocate idle extents in a more convenient and effective way to build an extent array.

Figure 3:
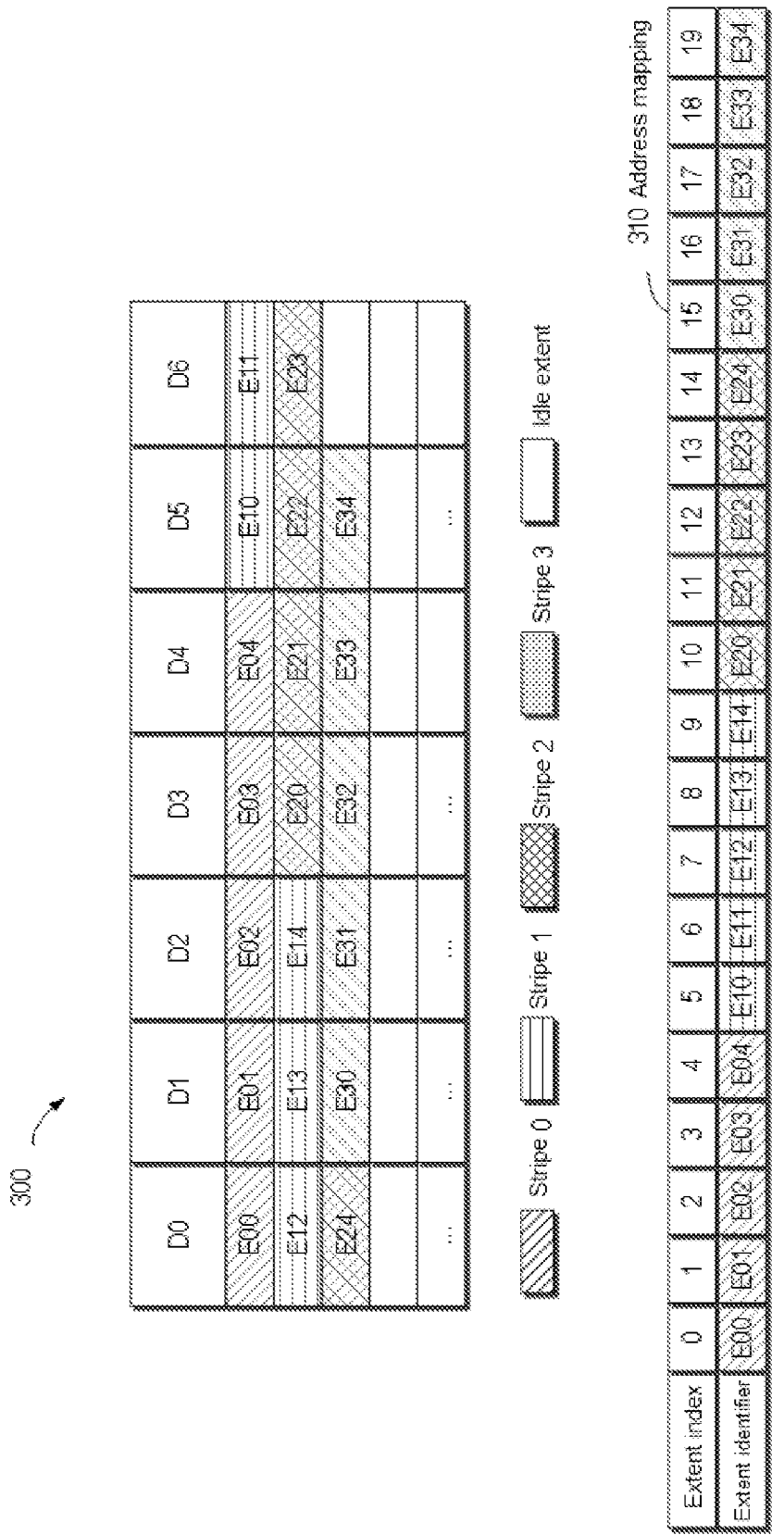
FIG. 3 schematically illustrates a block diagram of a process for generating an extent array in a storage system according to an implementation of the present disclosure.

In order to at least partially solve the problems in the above technical solution, a technical solution of generating an extent array in a storage system is proposed according to an example implementation of the present disclosure. Hereinafter, a process according to an example implementation of the present disclosure will be described in general with reference to FIG. 3. FIG. 3 schematically illustrates a block diagram of process 300 for generating an extent array in a storage system according to an implementation of the present disclosure. According to an example implementation of the present disclosure, the extents at a given position in each stripe are not required to be located in the same storage device, and the extents at a given position in each stripe are allowed to be located in different storage devices. In this way, it is not necessary to allocate a plurality of stripes at once, but it is possible to allocate only one stripe at a time and allocate all stripes in a plurality of rounds.

As shown in FIG. 3, the extents in stripe 0 may be selected from storage devices D0 to D4, the extents in stripe 1 may be selected from storage devices D5, D6, and D0 to D2, the extents in stripe 2 may be selected from storage devices D3 to D6 and D0, and the extents in stripe 3 may be selected from storage devices D1 to D5. In this way, the idle extents in the storage devices can be used in a more effective manner, and each storage device can be fully used.

According to an example implementation of the present disclosure, an upper layer component of the storage system does not need to care about the specific structure in the extent array, but can access data in the extent array through extent indexes. According to an example implementation of the present disclosure, address mapping 310 may be created to represent which extents are included in the extent array. Here, address mapping 310 includes an association relationship between extent identifiers of extents in the extent array and the extent indexes of the extents in the extent array. In this way. Since address mapping 310 stores the above-mentioned association relationship, the correspondence between the extent identifiers and the extent indexes can be determined based on address mapping 310 even if the extents at given positions in the plurality of stripes are located in different storage devices.

As shown in FIG. 3, the indexes may be established based on positions of the extents in the extent array. For example, the index of the 0th extent E00 in the extent array is 0, the index of the 1st extent E01 is 1, the index of the 12th block E22 is 12, and so on. In this way, through address mapping 310 according to the example implementation of the present disclosure, the position requirements in extent building in existing technical solutions can be eliminated, and the storage space in each storage device can be fully utilized. It will be understood that FIG. 3 only schematically illustrates a case where the storage system includes storage devices D0 to D6, and according to an example implementation of the present disclosure, the storage system may also include more or fewer storage devices. Further, a way to create a stripe may be specified. For example, a stripe may be created based on 8D+1P, 4D+1P+1Q, and/or other ways.

Figure 4:
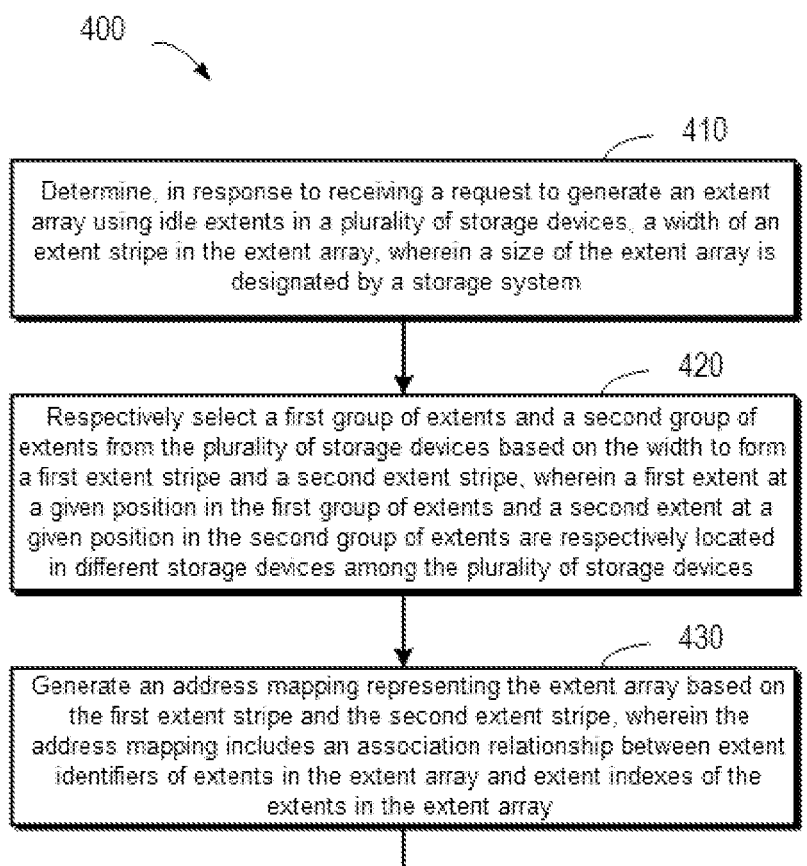
FIG. 4 schematically illustrates a flow chart of a method for generating an extent array in a storage system according to an implementation of the present disclosure.

Hereinafter, more details about generating an extent array will be described with reference to FIG. 4. FIG. 4 schematically illustrates a flow chart of method 400 for generating an extent array in a storage system according to an implementation of the present disclosure. At block 410, in response to receiving a request to generate an extent array using idle extents in a plurality of storage devices, a width of an extent stripe in the extent array is determined. Here, a size of the extent array is specified by the storage system. Generally speaking, the size is specified as 64G. The width of a stripe may be determined from the received request. Still referring to the example of FIG. 3, the stripe here may be a stripe based on 4D+1P, so the width of the stripe is 4+1=5. For another example, the request may specify that a stripe is generated based on 8D+1P+1Q, and the width of the stripe is 8+1+1=10.

At block 420, based on the width, a first group of extents and a second group of extents are respectively selected from the plurality of storage devices to form a first extent stripe and a second extent stripe. Here, a first extent at a given position in the first group of extents and a second extent at a given position in the second group of extents are respectively located in different storage devices among the plurality of storage devices. According to an example implementation of the present disclosure, it is not required that the extents at a given position in each stripe are located in the same storage device, but these extents may be located in different positions.

Returning to FIG. 3, the first group of extents E00, E01, E02, E03, and E04 may be selected from devices D0 to D4 respectively. Further, the second group of extents E10, E11, E12, E13, and E14 may be selected from storage devices D3 to D6 and D0. As shown in FIG. 3, at the moment, the 0th extents in two stripes (i.e., extents E00 and E10) are located in different storage devices D0 and D5 respectively, the 1st extents in two stripes (i.e., extents E01 and E11) are located in different storage devices D1 and D6, and so on.

According to an example implementation of the present disclosure, a group of extents may be selected from 5 storage devices each time to form a stripe. Specifically, the first group of extents may be selected from a first part of storage devices among the plurality of storage devices based on the width. Since the number of storage devices is always greater than the stripe width, an idle extent may be selected from each storage device in the first part of storage devices respectively. Further, the number of a second part of storage devices other than the first part of storage devices in the plurality of storage devices may be determined. If the number of the second part of storage devices is not less than the width, it means that the second part of storage devices is sufficient to provide the second group of extents, and therefore, the second group of extents may continue to be selected from the second part of storage devices.

If it is determined that the number of the second part of storage devices is less than the width, it means that the second part of storage devices is not sufficient to provide the second group of extents. At this moment, an idle extent may be selected from each storage device in the second part of storage devices, and remaining extents are selected from the first part of storage devices. Specifically, assuming that the width is W and the second part of storage devices only includes m (m<W) storage devices, m idle extents may be selected from the second part of storage devices, and based on a difference (W−m) between the width and the number of the second part of storage devices, the other part (i.e., W−m extents) of the second group of extents is selected from the first part of storage devices. At this moment, the first m extents in the second group of extents come from the second part of storage devices, and the last W−m extents come from the first part of storage devices.

According to an example implementation of the present disclosure, the plurality of storage devices may be sorted. For example, the plurality of storage devices may be sorted in an order of D0 to D6 as shown in FIG. 3. Further, the first part of storage devices and the second part of storage devices in the plurality of storage devices that are sorted may be determined based on the width. In other words, the first group of extents and the second group of extents may be selected from storage devices D0 to D6 in a circular order, respectively. After an idle extent has been selected from each of storage devices D0 to D6, the selection is back to storage device D0 again and idle extents continue to be selected from storage devices D0 to D6.

With an example implementation of the present disclosure, an idle extent may be continuously selected from the next storage device in an order and in a circular manner to form an extent stripe. At this moment, the extents at a given position in each stripe may be located in different storage devices. In this way, the position requirements when generating an extent array are eliminated. On the one hand, the extent array can be generated in a more convenient and effective way. On the other hand, the idle extents in the storage devices can be used as much as possible to improve the utilization rate of the storage devices.

Returning to FIG. 4, at block 430, an extent array is generated based on the first extent stripe and the second extent stripe. According to an example implementation of the present disclosure, an address mapping may be created for the extent array. Here, the address mapping includes an association relationship between extent identifiers of extents in the extent array and extent indexes of the extents in the extent array. Specifically, based on extent identifiers of the extents in the first group of extents and the second group of extents, a part associated with the extents in the address mapping of the extent array may be created.

As mentioned above, the extent identifier "Eij" may include the identifier of a stripe where the extent is located (for example, the ith stripe) and the position of the extent in the stripe (the jth extent in the ith stripe). At this moment, an extent index of the extent in the extent array may be determined based on the identifier "i," position "j," and width of the stripe. More details about the extent index will be described by returning to FIG. 3. In FIG. 3, the first row in address mapping 310 indicates an index of an extent in the extent array, and the second row indicates an extent identifier of the extent. Specifically, an extent identifier of the extent whose index is "0" in the extent array is E00, an extent identifier of the extent whose index is "10" in the extent array is E20, and so on. According to an example implementation of the present disclosure, address mapping 310 may be determined based on the following formula 1.

$$\text{Index}=j+W*i \qquad \text{Formula 1}$$

Where index represents the index of the extent in the extent array, i represents the identifier of the stripe where the extent is located (that is, the serial number of the stripe where the extent is located), j represents the position of the extent in the stripe, and W indicates the width of the stripe. Through the above formula 1, the association relationship between extent indexes and extent identifiers may be determined in a convenient and effective manner.

It will be understood that the foregoing only schematically describes a case where two stripes are included in an extent array. In an actual application environment, an extent array may include more stripes. Specifically, the number of stripes that should be included in the extent array may be determined according to the size of the extent array and the width. For example, in the storage system, the size of the extent array may be specified as 64G, and the extent array may be generated based on 4D+1P stripes. At this moment, the extent array will include 64/16=4 stripes. If the number of current stripes in the extent array is lower than the number of the stripes, method 400 described above can be used to continue to generate subsequent stripes from the plurality of storage devices.

Specifically, a third group of extents may be selected from the plurality of storage devices based on the width to form a third group of stripes, and a fourth group of extents may be selected to form a fourth group of stripes. Still referring to FIG. 3, the extents (E20, E21, E22, E23, and E24) in stripe 2 may be selected from storage devices D3 to D6 and D0, and the extents (E30, E31, E32, E33, and E34) in stripe 3 may be selected from storage devices D1 to D5. Then, the formed stripes may be added to the extent array. Specifically, the method shown in formula 1 above may be used to create a corresponding address mapping for each extent in the stripe.

It will be understood that the above only schematically shows a case where a plurality of storage devices are divided into one domain. According to an example implementation of the present disclosure, the plurality of storage devices may be divided into a plurality of domains. Assuming that the plurality of storage devices are divided into a first domain and a second domain, the first group of extents may be selected from a plurality of storage devices located in the first domain, and the second group of extents may be selected from a plurality of storage devices located in the second domain.

Figure 5:
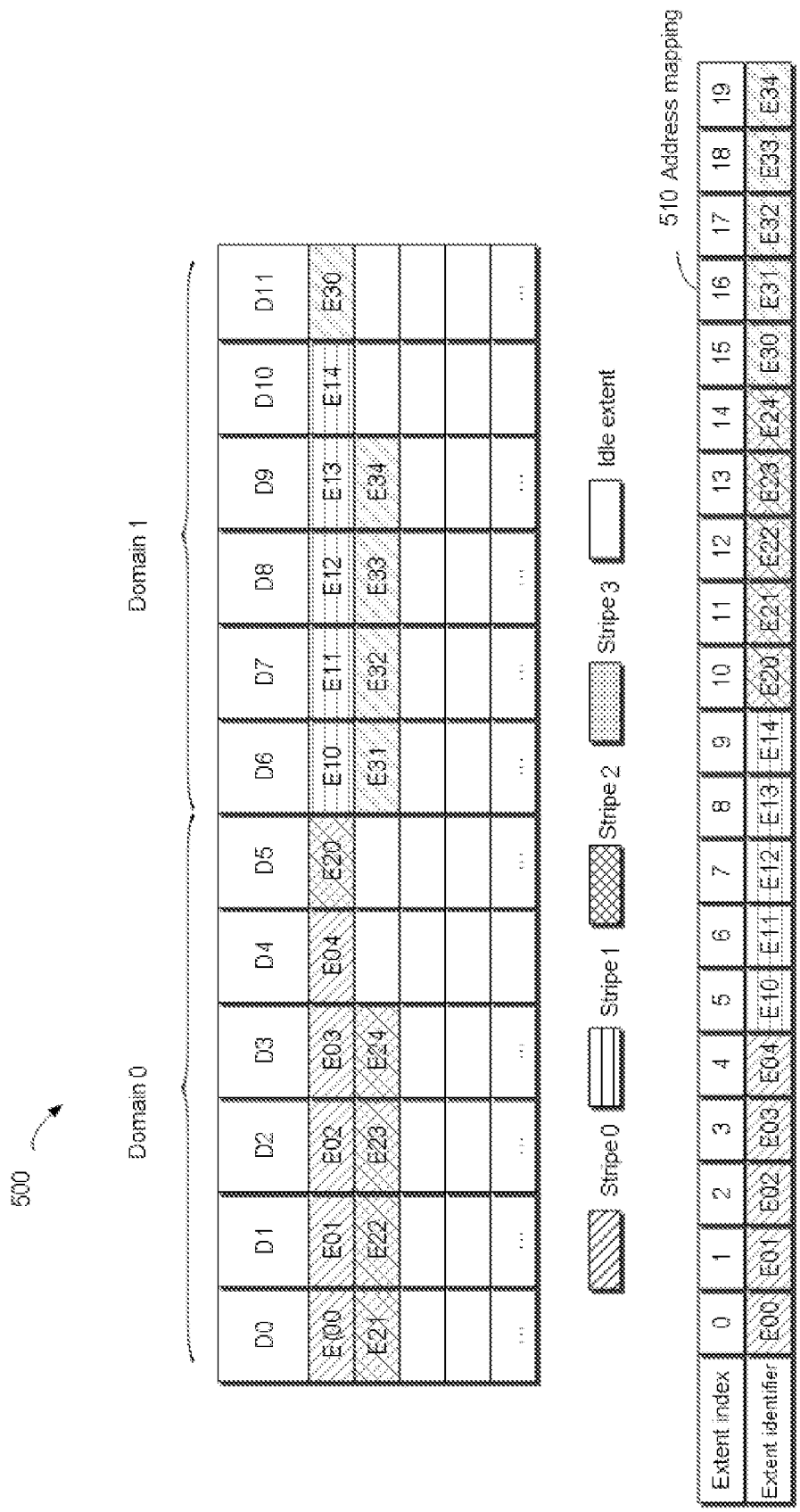
FIG. 5 schematically illustrates a block diagram of a process for generating an extent array in a storage system according to an implementation of the present disclosure.

Hereinafter, a case where the storage system includes two domains will be described with reference to FIG. 5. FIG. 5 schematically illustrates a block diagram of process 500 for generating an extent array in a storage system according to an implementation of the present disclosure. As shown in FIG. 5, storage devices D0 to D5 are grouped into domain 0, and storage devices D6 to D11 are grouped into domain 1. At this moment, extents (E00, E01, E02, E03, and E04) in stripe 0 may be selected from storage devices D0 to D4 in domain 0. Extents (E10, E11, E12, E13, and E14) in stripe 1 may be selected from storage devices D6 to D11 in domain 1.

According to an example implementation of the present disclosure, in a case where the stripe array includes 4 stripes, extents (E20, E21, E22, E23, and E24) in stripe 2 may be further selected from storage devices D5 and D0 to D3 in domain 0. Extents (E30, E31, E32, E33, and E34) in stripe 3 may be selected from storage devices D11 and D6 to D9 in domain 1. Further, address mapping 510 may be created based on the method described in formula 1 above. With an example implementation of the present disclosure, the extent array may be generated across multiple domains. In this way, the storage space in the storage system may be more fully utilized.

How to generate an extent array has been described above, and how to use address mapping of the extent array to manage the operation of the extent array will be further described below. It will be understood that with the operation of the storage system, an offline storage device may appear in the plurality of storage devices due to connection failures and/or storage device failures. Since the offline storage device cannot be accessed, degradation and a decline in reliability of the extent array will be caused. At this moment, a reconstruction operation needs to be performed to ensure that redundant data is included in the extent array.

According to an example implementation of the present disclosure, if it is determined that an offline storage device appears in the plurality of storage devices, an index of at least one offline extent located in the offline storage device in the extent array may be determined based on the address mapping. That is, all extents in the offline storage device in the extent array are found. Then, an address range of a group of extents involved in reconstruction may be determined based on found indexes. Further, data in the extent array may be reconstructed based on the address range.

Figure 6:
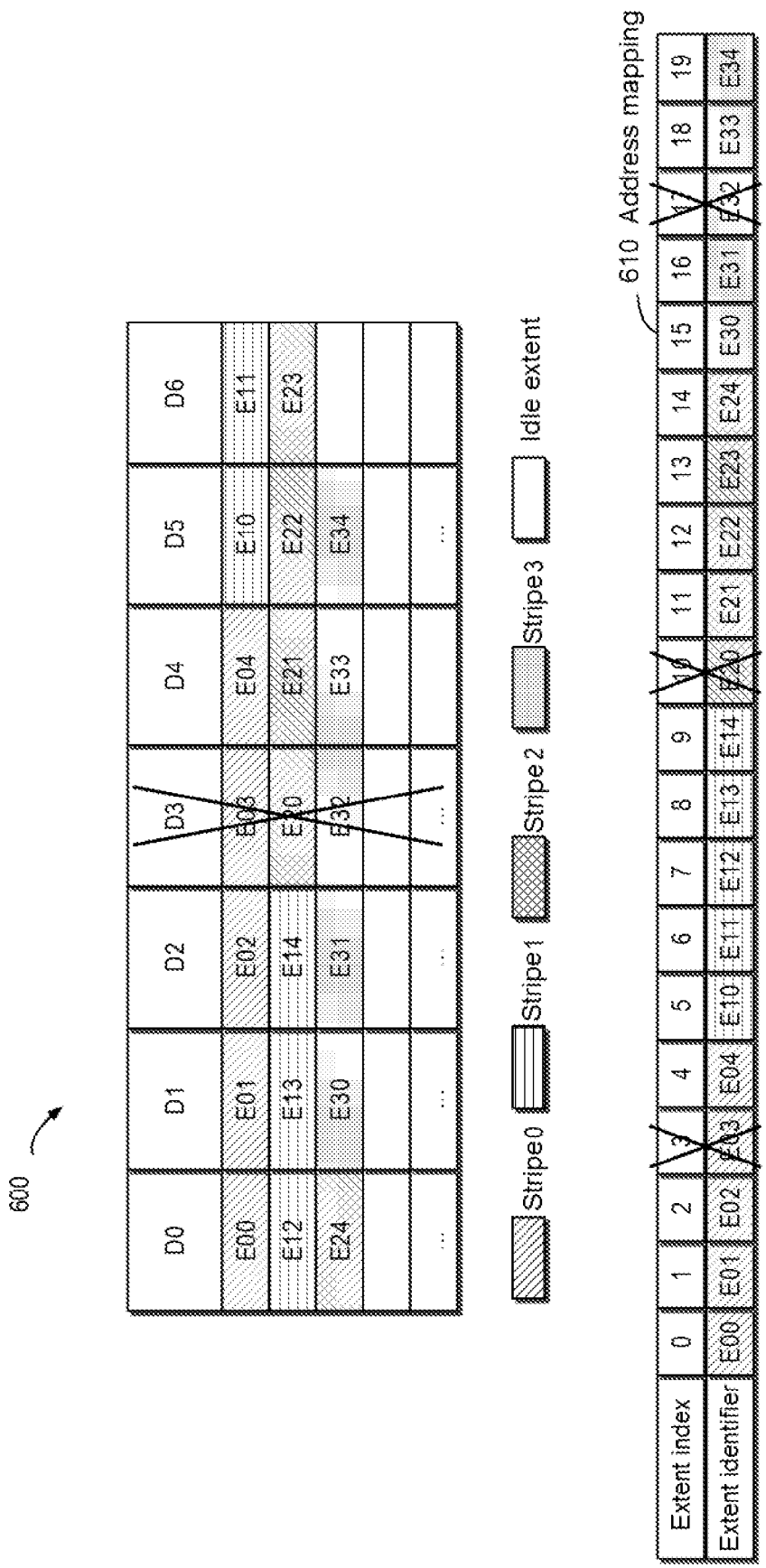
FIG. 6 schematically illustrates a block diagram of a process for reconstructing data in an offline storage device according to an implementation of the present disclosure.

Hereinafter, more details about the reconstruction operation will be described with reference to FIG. 6. FIG. 6 schematically illustrates a block diagram of process 600 for reconstructing data in an offline storage device according to an implementation of the present disclosure. It will be understood that FIG. 6 schematically illustrates a case where a plurality of storage devices are located in one domain, and according to an example implementation of the present disclosure, the plurality of storage devices may be located in different domains. As shown in FIG. 6, assuming that storage device D3 fails and is offline, it can be found based on address mapping 610 that 3 offline extents (i.e., indexes are respectively 3, 10, and 17) in the extent array are located in the offline storage device. Each of the above 3 offline extents may be processed separately.

First, the operation of the offline extent with the index being 3 is described. The extent index of offline extent E03 is 3, so the address range of a stripe where the extent is located is 0 to 16G. At this moment, a reconstruction operation may be performed for the address range of 0 to 16G. Specifically, a mapper in the storage system may search the address range involved in the reconstruction operation (return a search result of 0 to 16G). Further, the mapper may set a reconstruction bitmap, and data in offline extent E03 may be reconstructed based on data in the extents (that is, extents E00, E01, E02, and E04 with the extent indexes of 0, 1, 2, and 4 respectively) in online storage devices in the address range of 0 to 16G. After the reconstruction has been completed, the mapper may send a reconstruction success signal to indicate that the address range of 0 to 16G has been reconstructed. At this moment, the reconstruction bitmap may be cleared.

According to an example implementation of the present disclosure, the data in the offline extent may be reconstructed into idle extents in the online storage devices among the plurality of storage devices. Alternatively and/or additionally, a backup storage device may be added to the storage system to replace the offline storage device. It will be understood that the above only schematically shows the relevant reconstruction operation for offline extent E03. According to an example implementation of the present disclosure, the offline extents with the indexes of 10 and 17 may be respectively processed in a similar way, which will not be described in detail. In this way, a plurality of offline extents may be processed one by one, and the data in the plurality of offline extents may be reconstructed to idle extents in the plurality of online storage devices.

Figure 7:
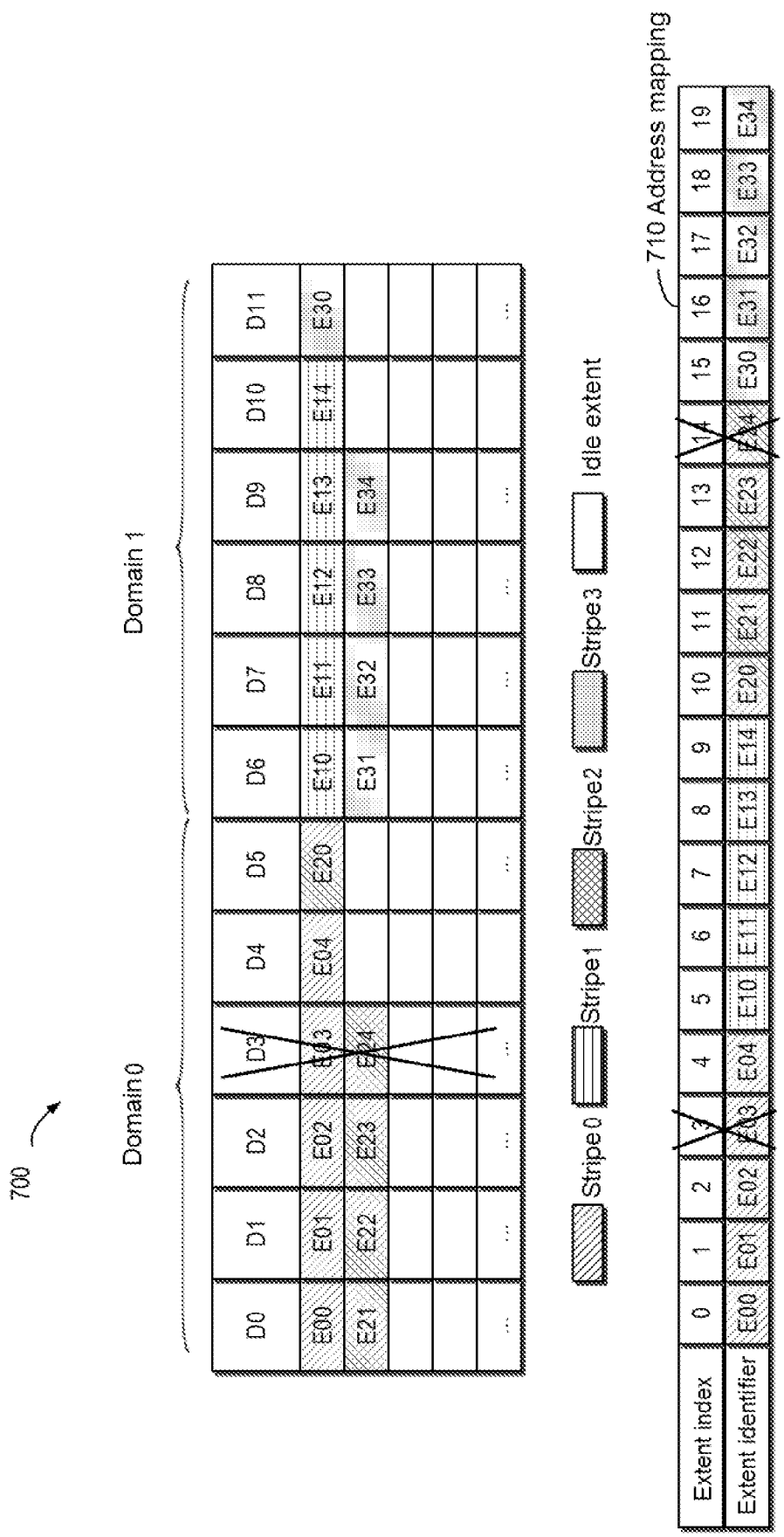
FIG. 7 schematically illustrates a block diagram of a process for reconstructing data in an offline storage device according to an implementation of the present disclosure.

Hereinafter, a case where the storage system includes a plurality of domains will be described with reference to FIG. 7. FIG. 7 schematically illustrates a block diagram of process 700 for reconstructing data in an offline storage device according to an implementation of the present disclosure. As shown in FIG. 7, assuming that storage device D3 fails and is offline, it can be found based on address mapping 710 that 2 offline extents (i.e., the indexes are 3 and 14) in the extent array are located in the offline storage device. Each of the above 2 offline extents may be processed separately. The extent index of one offline extent is 3, so the address range of a stripe where the extent is located is 0 to 16G. At this moment, a reconstruction operation may be performed for the address range of 0 to 16G through the method described above. Similarly, the extent index of the other offline extent is 14, so the address range of a stripe where the extent is located is 32 to 47G. According to an example implementation of the present disclosure, the address range involved in the reconstruction operation may be conveniently found by using the address mapping, and then the subsequent reconstruction operation may be initiated.

It will be understood that with the operation of the storage system, a certain storage device may be abnormal. Although the abnormal storage device can still be accessed at this moment, there may be a long time delay and/or other abnormal conditions in the access. At this moment, data in the abnormal storage device may be actively migrated to a normal storage device to avoid the degradation of the storage system caused by the further deterioration of the abnormal storage device.

According to an example implementation of the present disclosure, the index of at least one abnormal extent located in the abnormal storage device in the extent array may be determined based on the address mapping. In a case where the storage system includes a single domain, return to FIG. 6 to describe the situation in which storage device D3 becomes abnormal. At this moment, it can be found based on address mapping 610 that 3 abnormal extents (that is, the indexes are 3, 10, and 17 respectively) in the extent array are located in the abnormal storage device. Each of the above 3 abnormal extents may be processed separately. According to an example implementation of the present disclosure, an address range of a group of extents involved in migration in the extent array may be determined based on the indexes, and data in the extent array may be further migrated based on the address range. Specifically, the migration operation may be performed in a manner similar to the reconstruction operation described above. The difference is that since the data in the abnormal extent can still be accessed, the data may be copied directly from the abnormal extent at this moment.

It will be understood that when the storage system includes a plurality of domains, the migration operation may also be performed in a similar manner. Returning to FIG. 7 to describe the situation in which storage device D3 becomes abnormal, at this moment, it can be found based on address mapping 710 that 2 abnormal extents (i.e., the indexes are 3 and 14) in the extent array are located in the abnormal storage device. Each of the above 2 abnormal extents may be processed separately. According to an example implementation of the present disclosure, an address range involved in the migration operation may be conveniently found by using the address mapping, and then the subsequent migration operation may be initiated. In this way, the situation where data loss occurs in the storage system caused by the further deterioration of the abnormal storage device may be avoided.

The examples of the method according to the present disclosure have been described in detail above with reference to FIGS. 2 to 7, and the implementation of corresponding apparatuses will be described below. According to an example implementation of the present disclosure, an apparatus of generating an extent array in a storage system is provided. The storage system includes a plurality of storage devices. Specifically, the apparatus includes: a determining module configured to determine, in response to receiving a request to generate an extent array using idle extents in the plurality of storage devices, a width of an extent stripe in the extent array, wherein a size of the extent array is designated by the storage system; a selecting module configured to respectively select a first group of extents and a second group of extents from the plurality of storage devices based on the width to form a first extent stripe and a second extent stripe, wherein a first extent at a given position in the first group of extents and a second extent at a given position in the second group of extents are respectively located in different storage devices among the plurality of storage devices; and a generating module configured to generate an address mapping representing the extent array based on the first extent stripe and the second extent stripe, wherein the address mapping includes an association relationship between extent identifiers of extents in the extent array and extent indexes of the extents in the extent array. According to an example implementation of the present disclosure, the apparatus further includes modules for performing other steps in the method described above.

Figure 8:
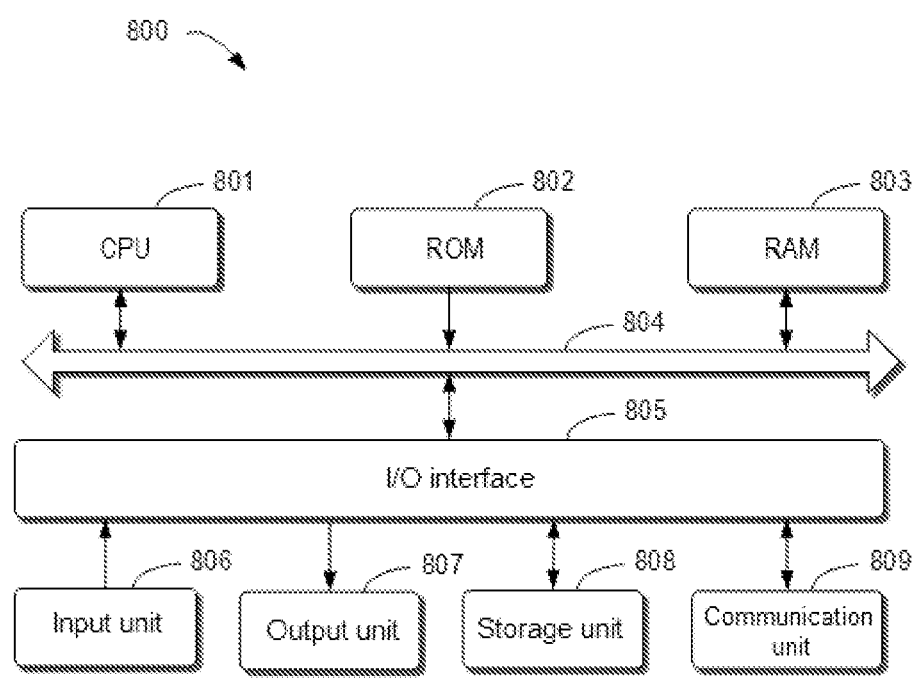
FIG. 8 schematically illustrates a block diagram of a device for generating an extent array in a storage system according to an example implementation of the present disclosure.

FIG. 8 schematically illustrates a block diagram of device 800 for generating an extent array in a storage system according to an example implementation of the present disclosure. As shown in the figure, device 800 includes central processing unit (CPU) 801, which may execute various appropriate actions and processing in accordance with computer program instructions stored in read-only memory (ROM) 802 or computer program instructions loaded onto random access memory (RAM) 803 from storage unit 808. In RAM 803, various programs and data required for the operation of device 800 may also be stored. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

Various processes and processing described above, for example, method 400, may be performed by processing unit 801. For example, in some implementations, method 400 may be implemented as a computer software program that is tangibly included in a machine-readable medium, such as storage unit 808. In some embodiments, part or all of the computer program may be loaded and/or installed on device 800 via ROM 802 and/or communication unit 809. When the computer program is loaded into RAM 803 and executed by CPU 801, one or more steps of method 400 described above may be performed. Alternatively, in other implementations, CPU 801 may also be configured in any other suitable manner to implement the above-described process/method.

According to an example implementation of the present disclosure, an electronic device is provided, including: at least one processor; and a memory coupled to the at least one processor and having instructions stored therein which, when executed by the at least one processor, cause the device to perform a method of generating an extent array in a storage system including a plurality of storage devices. The method includes: determining, in response to receiving a request to generate an extent array using idle extents in the plurality of storage devices, a width of an extent stripe in the extent array, wherein a size of the extent array is designated by the storage system; respectively selecting a first group of extents and a second group of extents from the plurality of storage devices based on the width to form a first extent stripe and a second extent stripe, wherein a first extent at a given position in the first group of extents and a second extent at a given position in the second group of extents are respectively located in different storage devices among the plurality of storage devices; and generating an address mapping representing the extent array based on the first extent stripe and the second extent stripe, wherein the address mapping includes an association relationship between extent identifiers of extents in the extent array and extent indexes of the extents in the extent array.

According to an example implementation of the present disclosure, selecting the first group of extents and the second group of extents includes: selecting the first group of extents from a first part of storage devices in the plurality of storage devices based on the width; determining the number of a second part of storage devices other than the first part of storage devices in the plurality of storage devices; and selecting the second group of extents from the second part of storage devices in response to a determination that the number of the second part of storage devices is not less than the width.

According to an example implementation of the present disclosure, the method further includes: in response to a determination that the number of the second part of storage devices is less than the width, selecting a part of the second group of extents from the second part of storage devices based on the number of the second part of storage devices; and selecting the other part of the second group of extents from the first part of storage devices based on a difference between the width and the number of the second part of storage devices.

According to an example implementation of the present disclosure, the method further includes: sorting the plurality of storage devices; and determining, based on the width, the first part of storage devices and the second part of storage devices in the plurality of storage devices that are sorted.

According to an example implementation of the present disclosure, generating the address mapping includes: creating the address mapping of the extent array based on extent identifiers of the extents in the first group of extents and the second group of extents.

According to an example implementation of the present disclosure, the extent identifiers include identifiers of stripes where the extents are located and positions of the extents in the stripes, and creating the address mapping includes: determining extent indexes of the extents in the extent array based on the identifiers of the stripes, the positions, and the width.

According to an example implementation of the present disclosure, the plurality of storage devices are divided into a first domain and a second domain, and respectively selecting the first group of extents and the second group of extents includes: selecting the first group of extents from a plurality of storage devices located in the first domain; and selecting the second group of extents from a plurality of storage devices located in the second domain.

According to an example implementation of the present disclosure, the method further includes: in response to a determination that an offline storage device appears in the plurality of storage devices, determining an index of at least one offline extent located in the offline storage device in the extent array based on the address mapping; determining an address range of a group of extents involved in reconstruction in the extent array based on the index; and reconstructing data in the extent array based on the address range.

According to an example implementation of the present disclosure, the method further includes: in response to a determination that an abnormal storage device appears in the plurality of storage devices, wherein the abnormal storage device is accessible and there is an access abnormality, determining an index of at least one abnormal extent located in the abnormal storage device in the extent array based on the address mapping; determining an address range of a group of extents involved in migration in the extent array based on the index; and migrating data in the extent array based on the address range.

According to an example implementation of the present disclosure, the method further includes: determining the number of stripes that should be included in the extent array according to the size of the extent array and the width; in response to the number of current stripes in the extent array being less than the number of the stripes, selecting a third group of extents from the plurality of storage devices based on the width to form a third group of stripes; and adding the third group of stripes to the extent array.

According to an example embodiment of the present disclosure, a computer program product is provided, wherein the computer program product is tangibly stored on a non-transitory computer-readable medium and includes machine-executable instructions which are used to implement the method according to the present disclosure.

According to an example implementation of the present disclosure, a computer-readable medium is provided. The computer-readable medium stores machine-executable instructions which, when executed by at least one processor, cause the at least one processor to implement the method according to the present disclosure.

The present disclosure may be a method, a device, a system, and/or a computer program product. The computer program product may include a computer-readable storage medium, on which computer-readable program instructions used for executing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device (for example, a punch card or a raised structure in a groove with instructions stored thereon), and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The computer-readable program instructions are received by a network adapter card or network interface of each computing/processing device from the network, and are forwarded to be stored in the computer-readable storage medium of each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be completely executed on a user's computer, partially executed on a user's computer, executed as an independent software package, partially executed on a user's computer and partially executed on a remote computer, or completely executed on a remote computer or a server. In cases where a remote computer is involved, the remote computer may be connected to a user's computer over any kind of networks, including a local area network (LAN) or a wide area network (WAN), or may be connected to an external computer (e.g., over the Internet by using an Internet service provider). In some implementations, an electronic circuit, for example, a programmable logic circuit, a field programmable gate array (FPGA), or a programmable logic array (PLA), is personalized by utilizing state information of computer-readable program instructions, and the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow chart and/or block diagrams and combinations of blocks in the flow charts and/or block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flowcharts and/or block diagrams. The computer-readable program instructions may also be stored in the computer-readable storage medium, and the instructions cause a computer, a programmable data processing apparatus, and/or other devices to work in a specific manner, such that the computer-readable medium having instructions stored includes an article of manufacture that includes instructions for implementing various aspects of the functions/actions specified in one or more blocks in the flow charts and/or block diagrams.

The computer-readable program instructions may also be loaded onto computers, other programmable data processing apparatuses, or other devices, so that a series of operating steps may be executed on the computers, other programmable data processing apparatuses, or other devices to produce a computer-implemented process. Therefore, the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of systems, methods, and computer program products according to multiple implementations of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should also be noted that each block in the block diagrams and/or flow charts and a combination of blocks in the block diagrams and/or flow charts may be implemented by a dedicated hardware-based system for executing specified functions or actions, or may be implemented by a combination of dedicated hardware and computer instructions.

Various implementations of the present disclosure have been described above. The above description is illustrative and not exhaustive, and is not limited to the various implementations disclosed. Many modifications and variations will be apparent to those of ordinary skill in the art without departing from the scope and spirit of the illustrated various implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method of generating an extent array in a storage system that comprises a plurality of storage devices, the method comprising:
   determining, in response to receiving a request to generate an extent array using idle extents in the plurality of storage devices, a width of an extent stripe in the extent array, wherein a size of the extent array is designated by the storage system;
   respectively selecting a first group of extents and a second group of extents from the plurality of storage devices based on the width to form a first extent stripe and a second extent stripe,
   wherein respectively selecting the first group of extents and the second group of extents includes assigning extent identifiers to extents in the plurality of storage devices, each extent identifier indicating (i) a corresponding extent stripe and (ii) a position in the corresponding extent stripe, the position being a relative placement in an ordered list of extents forming the corresponding extent stripe,
   wherein a first extent at a given position in the first extent stripe and a second extent at a given position in the second extent stripe are respectively located in different storage devices among the plurality of storage devices, the given position in the first extent stripe being equal to the given position in the second extent stripe;
   wherein the method further comprises:
   generating an address mapping representing the extent array based on the first extent stripe and the second extent stripe, wherein the address mapping comprises an association relationship between the extent identifiers and extent indexes of the extents in the extent array;
   wherein assigning the extent identifiers includes assigning, to the extents, (i) extent stripe numbers indicating corresponding extent stripes and (ii) position numbers indicating positions in the corresponding extent stripes; and
   wherein generating the address mapping includes calculating respective values of the extent indexes using the extent stripe numbers and the position numbers.

2. The method according to claim 1, wherein selecting the first group of extents and the second group of extents comprises:
   selecting the first group of extents from a first set of storage devices in the plurality of storage devices based on the width;
   determining a number of a second set of storage devices other than the first set of storage devices in the plurality of storage devices; and
   selecting the second group of extents from the second set of storage devices in response to a determination that the number of the second set of storage devices is not less than the width.

3. The method according to claim 1, wherein selecting the first group of extents and the second group of extents includes:
   selecting the first group of extents from a first set of storage devices in the plurality of storage devices based on the width;
   determining a number of a second set of storage devices other than the first set of storage devices in the plurality of storage devices; and
   in response to a determination that the number of the second set of storage devices is less than the width:
      selecting a part of the second group of extents from the second set of storage devices based on the number of the second set of storage devices; and
      selecting a remaining part of the second group of extents from the first set of storage devices based on a difference between the width and the number of the second part of storage devices.

4. The method according to claim 2, further comprising: sorting the plurality of storage devices; and
   determining, based on the width, the first set of storage devices and the second set of storage devices in the plurality of storage devices that are sorted.

5. The method according to claim 1, wherein generating the address mapping comprises:
   creating the address mapping of the extent array based on extent identifiers of the extents in the first group of extents and the second group of extents.

6. The method according to claim 5, wherein the extent identifiers comprise identifiers of stripes where the extents are located and positions of the extents in the stripes, and creating the address mapping comprises:
   determining the extent indexes of the extents in the extent array based on the identifiers of the stripes, the positions, and the width.

7. The method according to claim 1, wherein the plurality of storage devices are divided into a first domain and a second domain, and wherein respectively selecting the first group of extents and the second group of extents comprises:

selecting the first group of extents from a plurality of storage devices located in the first domain; and selecting the second group of extents from a plurality of storage devices located in the second domain.

8. The method according to claim 1, further comprising: in response to a determination that an offline storage device appears in the plurality of storage devices, determining, based on the address mapping, an index of at least one offline extent located in the offline storage device in the extent array;

determining, based on the index, an address range of a group of extents involved in reconstruction in the extent array; and reconstructing data in the extent array based on the address range.

9. The method according to claim 1, further comprising: in response to a determination that an abnormal storage device appears in the plurality of storage devices, wherein the abnormal storage device is accessible and there is an access abnormality, determining, based on the address mapping, an index of at least one abnormal extent located in the abnormal storage device in the extent array;

determining, based on the index, an address range of a group of extents involved in migration in the extent array; and migrating data in the extent array based on the address range.

10. The method according to claim 1, further comprising: determining the number of stripes that should be comprised in the extent array according to the size of the extent array and the width;

in response to the number of current stripes in the extent array being less than the number of the stripes, selecting a third group of extents from the plurality of storage devices based on the width to form a third group of stripes; and adding the third group of stripes to the extent array.

11. An electronic device, comprising:

at least one processor; and a memory coupled to the at least one processor, wherein the memory has instructions stored therein which, when executed by the at least one processor, cause the device to perform a method of generating an extent array in a storage system that comprises a plurality of storage devices, and the method comprises:

determining, in response to receiving a request to generate an extent array using idle extents in the plurality of storage devices, a width of an extent stripe in the extent array, wherein a size of the extent array is designated by the storage system;

respectively selecting a first group of extents and a second group of extents from the plurality of storage devices based on the width to form a first extent stripe and a second extent stripe, respectively selecting a first group of extents and a second group of extents from the plurality of storage devices based on the width to form a first extent stripe and a second extent stripe, wherein respectively selecting the first group of extents and the second group of extents includes assigning extent identifiers to extents in the plurality of storage devices, each extent identifier indicating (i) a corresponding extent stripe and (ii) a position in the corresponding extent stripe, the position being a relative placement in an ordered list of extents forming the corresponding extent stripe, wherein a first extent at a given position in the first extent stripe and a second extent at a given position in the second extent stripe are respectively located in different storage devices among the plurality of storage devices, the given position in the first extent stripe being equal to the given position in the second extent stripe;

wherein the method further comprises:

generating an address mapping representing the extent array based on the first extent stripe and the second extent stripe, wherein the address mapping comprises an association relationship between the extent identifiers and extent indexes of the extents in the extent array;

wherein assigning the extent identifiers includes assigning, to the extents, (i) extent stripe numbers indicating corresponding extent stripes and (ii) position numbers indicating positions in the corresponding extent stripes; and wherein generating the address mapping includes calculating respective values of the extent indexes using the extent stripe numbers and the position numbers.

12. The device according to claim 11, wherein selecting the first group of extents and the second group of extents comprises:

selecting the first group of extents from a first set of storage devices in the plurality of storage devices based on the width;

determining a number of a second set of storage devices other than the first set of storage devices in the plurality of storage devices; and selecting the second group of extents from the second set of storage devices in response to a determination that the number of the second set of storage devices is not less than the width.

13. The device according to claim 11, wherein selecting the first group of extents and the second group of extents includes:

selecting the first group of extents from a first set of storage devices in the plurality of storage devices based on the width;

determining a number of a second set of storage devices other than the first set of storage devices in the plurality of storage devices; and in response to a determination that the number of the second part of storage devices is less than the width:

selecting a part of the second group of extents from the second set of storage devices based on the number of the second set of storage devices; and selecting a remaining part of the second group of extents from the first set of storage devices based on a difference between the width and the number of the second set of storage devices.

14. The device according to claim 12, wherein the method further comprises:

sorting the plurality of storage devices; and determining, based on the width, the first set of storage devices and the second set of storage devices in the plurality of storage devices that are sorted.

15. The device according to claim 11, wherein generating the address mapping comprises:

creating the address mapping of the extent array based on extent identifiers of the extents in the first group of extents and the second group of extents.

16. The device according to claim 15, wherein the extent identifiers comprise identifiers of stripes where the extents are located and positions of the extents in the stripes, and creating the address mapping comprises:

determining the extent indexes of the extents in the extent array based on the identifiers of the stripes, the positions, and the width.

17. The device according to claim 11, wherein the plurality of storage devices are divided into a first domain and a second domain, and wherein respectively selecting the first group of extents and the second group of extents comprises:
selecting the first group of extents from a plurality of storage devices located in the first domain; and
selecting the second group of extents from a plurality of storage devices located in the second domain.

18. The device according to claim 11, wherein the method further comprises: in response to a determination that an offline storage device appears in the plurality of storage devices,
determining, based on the address mapping, an index of at least one offline extent located in the offline storage device in the extent array;
determining, based on the index, an address range of a group of extents involved in reconstruction in the extent array; and
reconstructing data in the extent array based on the address range.

19. The device according to claim 11, wherein the method further comprises: in response to a determination that an abnormal storage device appears in the plurality of storage devices, wherein the abnormal storage device is accessible and there is an access abnormality,
determining, based on the address mapping, an index of at least one abnormal extent located in the abnormal storage device in the extent array;
determining, based on the index, an address range of a group of extents involved in migration in the extent array; and
migrating data in the extent array based on the address range.

20. The device according to claim 11, wherein the method further comprises:
determining the number of stripes that should be comprised in the extent array according to the size of the extent array and the width;
in response to the number of current stripes in the extent array being less than the number of the stripes, selecting a third group of extents from the plurality of storage devices based on the width to form a third group of stripes; and
adding the third group of stripes to the extent array.

21. A computer program product having a non-transitory computer readable medium which stores a set of instructions to generate an extent array in a storage system that comprises a plurality of storage devices; the set of instructions, when carried out by computerized circuitry, causing the computerized circuitry to perform a method of:

determining, in response to receiving a request to generate an extent array using idle extents in the plurality of storage devices, a width of an extent stripe in the extent array, wherein a size of the extent array is designated by the storage system;
respectively selecting a first group of extents and a second group of extents from the plurality of storage devices based on the width to form a first extent stripe and a second extent stripe,
respectively selecting a first group of extents and a second group of extents from the plurality of storage devices based on the width to form a first extent stripe and a second extent stripe,
wherein respectively selecting the first group of extents and the second group of extents includes assigning extent identifiers to extents in the plurality of storage devices, each extent identifier indicating (i) a corresponding extent stripe and (ii) a position in the corresponding extent stripe, the position being a relative placement in an ordered list of extents forming the corresponding extent stripe,
wherein a first extent at a given position in the first extent stripe and a second extent at a given position in the second extent stripe are respectively located in different storage devices among the plurality of storage devices, the given position in the first extent stripe being equal to the given position in the second extent stripe;
wherein the method further comprises:
generating an address mapping representing the extent array based on the first extent stripe and the second extent stripe, wherein the address mapping comprises an association relationship between the extent identifiers and extent indexes of the extents in the extent array;
wherein assigning the extent identifiers includes assigning, to the extents, (i) extent stripe numbers indicating corresponding extent stripes and (ii) position numbers indicating positions in the corresponding extent stripes; and
wherein generating the address mapping includes calculating respective values of the extent indexes using the extent stripe numbers and the position numbers.

22. The method according to claim 1, further comprising:
locating, from the extent indexes, an extent index of an offline extent;
identifying, from an extent identifier mapped to the located extent index, an extent stripe formed using the offline extent;
locating a set of online extents with extent identifiers indicating the identified extent stripe; and
reconstructing data of the offline extent using data of the set of online extents.

* * * * *